April 28, 1953     B. B. SWEET     2,636,266
SPOON HAVING A ROTATABLE HANDLE
Filed July 29, 1949
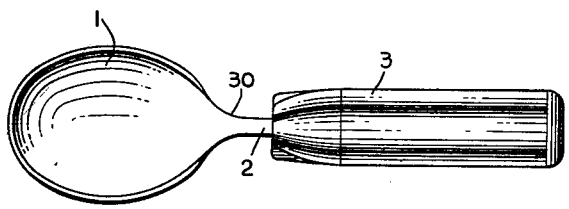
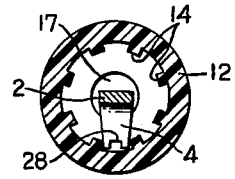
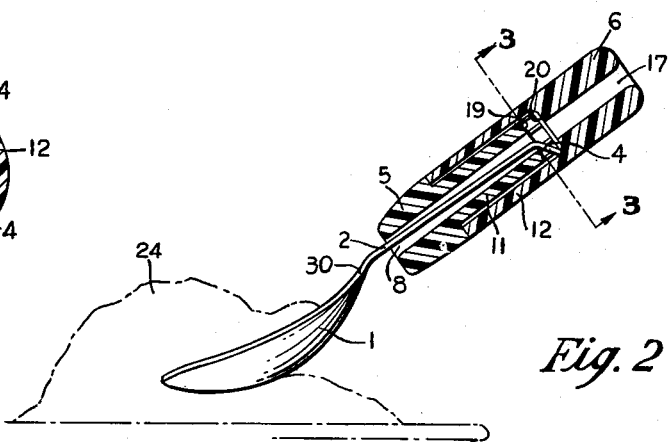
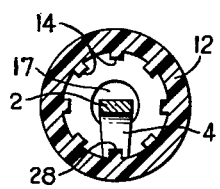 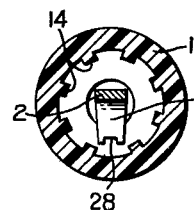
 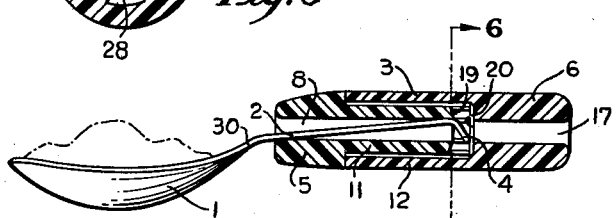
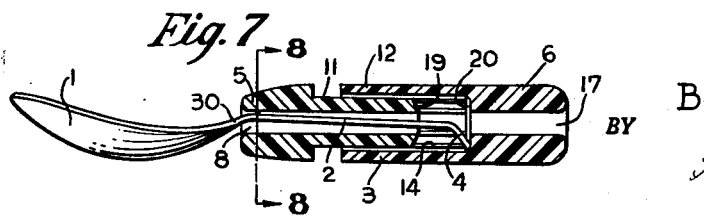
INVENTOR.
Bert B. Sweet
BY
ATTORNEY Patented Apr. 28, 1953

2,636,266

UNITED STATES PATENT OFFICE 2,636,266

SPOON HAVING A ROTATABLE HANDLE

Bert B. Sweet, Akron, Ohio

Application July 29, 1949, Serial No. 107,611

3 Claims. (Cl. 30—324)

This invention relates to a novel spoon. The spoon has a rotatable handle and is designed particularly for use in training a young child.

Most children experience considerable difficulty in learning to hold the handle of a spoon so that the bowl of the spoon is level and food thereon is not spilled over the sides of the bowl while they are eating. The handle of the spoon of this invention is rotatable with respect to the bowl. Regardless of the manner in which the child may hold this handle, the bowl will remain substantially level when it is weighted with food.

The handle of the spoon is normally rotatable on a shank which projects from the bowl of the spoon. This arrangement is satisfactory for eating liquid food such as soup, etc. However, it is difficult to lift solid food onto the bowl of the spoon when the handle is rotatable. Therefore, means are provided in the handle which temporarily engage the handle with the shank, thereby preventing the handle from being rotated when the bowl is pressed against solid foods. The handle is also designed so that it can be permanently locked in a fixed position relative to the bowl portion and is then to be used as a conventional spoon.

The structure of the spoon will be further described in conjunction with the drawings, in which—

Fig. 1 is a plan view of the spoon;

Fig. 2 is a side view of the spoon showing the bowl thereof in contact with solid food in a dish, the handle being shown in cross section;

Fig. 3 is an enlarged cross-sectional view of the handle taken on the line 3—3 of Fig. 2;

Fig. 4 is a view similar to Fig. 3 but showing the end portion of the shank in a different position;

Fig. 5 is a side view of the spoon as it appears when lifting food normally, the handle being shown in cross section;

Fig. 6 is an enlarged cross-sectional view through the handle on the line 6—6 of Fig. 5;

Fig. 7 is a side view of the spoon showing the handle locked in non-rotatable position relative to the bowl; and Fig. 8 is a cross-sectional view through the handle on the line 8—8 of Fig. 7.

The preferred spoon includes a bowl 1 with a narrow shank 2 projecting from the rim of the bowl into a handle 3 which is normally rotatable about the shank. The end of the shank is bent over at 4. The handle 3 is formed in two sections 5 and 6. Section 5 is provided with an opening 8 through the center through which the shank 2 fits. Opening 8 is larger than the shank and loosely surrounds it. The bent-over end 4 of the shank fits over the outer end of section 5. The end of the shank may be bent after the shank has been passed through opening 8, or as to prevent separation of section 5 of the handle from the shank and bowl.

The outer portion 11 of section 5 is telescopically fitted into the hollow forward portion 12 of handle section 6. The inner surface of portion 12, at least at its outer end, is provided with splines 14 (Fig. 3). These splines contact the outer surface of portion 11 and make a tight frictional engagement therewith. Preferably, there is an opening 17 through the rear of section 6, concentric with opening 8 in section 5, so that water can be flushed through the handle to facilitate cleaning the spoon. The bent-over end 4 of the shank is retained in the small space between the end 19 of portion 11 and the shoulder 20 which surrounds the opening 17.

When the bowl contains food the bent-over end 4 of the shank will be lifted free of the splined surface, in the position shown in Fig. 5. In this position the bowl remains level even though the handle 3 be rotated on the shank. Fig. 6 is a cross section through the handle showing the position of bent-over end 4 with respect to the splines when the handle is in rotatable position. It can be seen from this figure that the handle may be turned freely because no part of the shank is engaged with the splined surface.

When the spoon is to be used for eating foods other than liquids, it is desirable to temporarily prevent the rotation of the handle on the shank until the food has been scooped up into the bowl. As illustrated in Fig. 2, when the bowl is pressed against solid food 24 in a dish 25 the front of the shank 2 will be pressed against the top of the opening 8. This forces the bent-over end 4 at the outer end of the shank downward and engages it between the splines 14 inside the portion 12 of the handle. Fig. 3 shows a cross section of the handle with the bent-over end so engaged. While in this position it is evident that the handle cannot be turned relative to the bowl. As soon as the food is lifted, the pressure of the shank against the top of opening 8 will be relieved and it will drop back to a position such as is shown in Fig. 5, and the handle will again be free to rotate. Thus, a child using the spoon, will have no difficulty getting food onto it, and as soon as he has lifted the spoon with food on it, the bowl will remain level regardless of the position to which the child may turn the handle.

A small notch 28 is preferably cut into the tip of the bent-over end 4, of a size to fit over a spline (Fig. 4). This doubles the number of positions in which the shank may be engaged with the handle.

Fig. 7 shows the handle locked in a fixed position relative to the shank. To accomplish this, section 5 is separated somewhat from section 6 and is moved along the shank toward the wider portion 30 thereof near the bowl, until the wider part of the shank fits tight in the upper part of opening 8 in section 5 (Fig. 8). The spoon is cocked so that the bent-over portion 4 of the shank is pressed between splines on the inner surface of portion 12. Section 5 is then telescoped into section 6 until the shoulder is pushed into contact with the bent-over portion 4, to hold the shank in its cocked position. There is sufficient friction between the surfaces of portions 11 and 12 to hold the sections 5 and 6 of the handle in this position, and under normal eating conditions the handle cannot be turned relatively to the bowl.

Preferably, the bowl and shank are of conventional silver plate used for silverware, although it is recognized that they may be formed from plastic or stainless steel. Handle 3 is preferably plastic and a non-softening plastic such as styrene is preferred so that the spoon may be sterilized, although it may be made from any metal, etc.

What I claim is:

1. A spoon comprising a bowl, a straight shank extending therefrom, engaging means on the shank away from the bowl, a handle rotatable about the shank and said engaging means, and means for locking said engaging means in the handle in position when pressure is exerted on the bowl as the bowl is pressed down against an object.

2. A spoon comprising a bowl, a shank extending therefrom, engaging means on the shank away from the bowl, and a handle in two sections, the first section loosely surrounding the shank between the bowl and the engaging means and being normally rotatable thereon, the second section being releasably engaged over the outer end of the first section, and means on the second section for locking said engaging means in position when pressure is exerted on the bowl as the bowl is pressed down against an object.

3. A spoon which includes a metal bowl with an extension therefrom which constitutes a shank, the end of the shank away from the bowl being notched and bent downwardly, and a handle formed of two cylindrical members each with a hollow axis, the first of said members encircling the shank, the hollow therein being large enough to permit free rotation of the member about the shank and sufficiently small to prevent the bent end of the shank from passing therethrough; the second member telescoped over that end of first member which is farthest from the bowl, that portion of the hollow of the second member which is adjacent the first member being large enough to permit free rotation of the bent end of the shank therein, and said portion of the hollow being provided on all sides with projections adapted to cooperate with the notch in the bent end of the shank to prevent rotation of the shank when one of the projections is engaged in the notch, the axes of the two members being in substantial alignment.

BERT B. SWEET.

References Cited in the file of this patent

UNITED STATES PATENTS

| Number | Name | Date |
|---|---|---|
| 659,341 | Dodd et al. | Oct. 9, 1900 |
| 1,176,248 | Rottner et al. | Mar. 21, 1916 |
| 1,749,051 | Watt | Mar. 4, 1930 |
| 1,775,813 | Colby | Sept. 16, 1930 |
| 2,004,659 | Groch | June 11, 1935 |
| 2,450,347 | Krilow | Sept. 28, 1948 |
| 2,453,525 | McNeill | Nov. 9, 1948 |
| 2,505,122 | Kreiger | Apr. 25, 1950 |